United States Patent [19]

Fujii

[11] Patent Number: 5,146,343

[45] Date of Patent: Sep. 8, 1992

[54] IMAGE PROCESSING DEVICE FOR DETERMINING AND PRINTING A MAXIMUM NUMBER OF IMAGE FRAMES IN DESIRED SIZE AND LAYOUT

[75] Inventor: Yoshiharu Fujii, Sakurai, Japan

[73] Assignee: Sharp Kabushiki Kaisha, Osaka, Japan

[21] Appl. No.: 613,053

[22] Filed: Nov. 15, 1990

[30] Foreign Application Priority Data

Nov. 20, 1989 [JP] Japan ................... 1-302748

[51] Int. Cl.$^5$ ............... H04N 1/23; H04N 1/387; H04N 1/393
[52] U.S. Cl. ..................... 358/296; 358/449; 358/450; 358/451
[58] Field of Search ........... 358/296, 401, 444, 449, 358/450, 451, 443, 78

[56] References Cited

U.S. PATENT DOCUMENTS

| | | | |
|---|---|---|---|
| 4,342,052 | 7/1982 | Rackley et al. | 358/451 |
| 4,672,462 | 6/1987 | Yamada | 358/450 |
| 4,694,352 | 9/1987 | Ina | 382/55 |
| 4,710,821 | 12/1987 | Ohta . | |
| 4,814,894 | 3/1989 | Yoshida | 358/451 |
| 4,924,324 | 5/1990 | Takaoka | 358/449 |
| 4,965,662 | 10/1990 | Shiota | 358/78 |

FOREIGN PATENT DOCUMENTS 0255942 2/1988 European Pat. Off. .
0290949 11/1988 European Pat. Off. .

Primary Examiner—Benjamin R. Fuller
Assistant Examiner—Scott A. Rogers
Attorney, Agent, or Firm—Nixon & Vanderhye

[57] ABSTRACT

An image processing device prints a maximum possible numbers of frames of an original image on one or more printing materials. A CPU develops the frame and printing material information stored in memory area so that a maximum number of possible frames can be placed within the printing material by selecting the layout and magnification/reduction the frames. By switching the alternative print material according to previously determined priory, the printing operation is continued without any interruption, even if the printing material currently in use runs out during the printing. The boundaries between frames are drawn by lines for convenience to separate each frame after printing.

10 Claims, 4 Drawing Sheets

IMAGE PROCESSING DEVICE FOR DETERMINING AND PRINTING A MAXIMUM NUMBER OF IMAGE FRAMES IN DESIRED SIZE AND LAYOUT

BACKGROUND OF THE INVENTION

1. Field of the Invention

The present invention relates to an image processing device and, more particularly, to an image processing device particularly suitable for printing a plurality of frames of an image of an original document in one or more copying papers.

2. Description of the Related Arts

In the case where an original is relatively smaller than the printing material, an image processing device prints a frame of an image of the original only on the small area of the printing material and the remaining area is blank. To minimize such a blank area of the printing material, it is considered to print a plurality of frames on the printing material, hereinafter referred as to "multi-frame printing."

Indeed, the multi-frame printing operation is an effective means to minimize the unnecessary blank area of the printed material, if the original is relatively smaller than the printing material. However, if the original and the printing material are almost the same size, the multi-frame printing operation can not be so profitable Even in the case where the original is a magnified one, the multi-frame printing is also possible if such a magnified original is reduced to a suitable size for multi-printing. It is needless to say that a suitable reduction or magnification rate represented by the ratio of the printed frame size to the original frame size must be determined prior to the printing operation.

Generally, the reduction/magnification rate can be obtained by the calculations based on the sizes of the original and the printing material, and the required number of frames to be printed. By repeating trial printing based the reduction/magnification rate obtained by the above described calculation, the most suitable reduction or magnification rate will be finally fixed.

Further, in the case where a plurality of frames are printed on a printing paper which is larger than the frame of original, the more frames may be printed on the printing material if the frames are placed as aligned in the lateral direction, i.e., 90° tilted layout with respect to the ordinal vertical layout. The selection of layout, vertical or lateral directions, is left to the user.

Also, the image processing device equipped with various sizes of printing materials are also available so that the user can select the desirable size of printing material. In this case, it is possible to obtain a most effective layout of frames if the user may select the suitable size of printing material in relation to the frame size.

In the multi-frame printing, each frames printed on the printing material will be generally separated each other.

However, as described in the above, in the case where the original is relatively smaller than the printing material, an image processing device of the prior arts prints only one frame on a small area of the printing material with its rested remaining area being blank. This means an extravagance of printing material, time and cost.

Further in the multi-frame printing, if the original and the printing material are almost the same size, it is unavoidable to repeat trial printing to determine the most suitable reduction/magnification rate. In course of these efforts for rate determination, the user must confirm the result of trial printing by observing the relationship between the printed frames and the blank area of the printing material at every trial printing, which is really bothersome and uneconomical task.

Further, since the blank area of the printed material depends on the conditions such as the layout of the frames to be printed on the printing material, the size of the printing material available for use and the layout of the original, it will take considerable time to find a best combination of those conditions to minimize such blank area of printed material, which lowers the efficiency of printing operation entirely.

In any way, the multi-frames printed on one printing material shall be separated each other for use but such separated frames are likely to have various sizes and uncertain configurations.

Further, when the user erroneously selects unsuitable size of printing material, the printed material with an unnecessarily vast blank area will be produced, which is wasteful of time and money.

When the printing material currently in use runs out during the printing operation, the image processing device of the prior art will interrupt the printing and require the user's assistance such as refilling the printing material or selecting the alternative printing material.

SUMMARY OF THE INVENTION

The present invention has been developed with a view to substantially solving the above described disadvantages and has for its essential object to provide an improved image processing device.

According to the present invention, an image processing device for printing a plurality of frames of an image of an original on a printing material comprising a data processing means for processing data of the original and the printing material, the data representing the size (width and length) of the original and the printing material, and a memory means for storing a processed data of frame and printing material.

When the data are processed, a plurality of frame data of the original are laid out within a single frame data of printing material stored in memory means so that as many as possible frames are arranged.

BRIEF DESCRIPTION OF THE DRAWINGS

These and other objects and features of the present invention will become clear from the following description taken in conjunction with the preferred embodiment thereof with reference to the accompanying drawings, throughout which like parts are designated by like reference numerals, and in which.

DETAILED DESCRIPTIONS OF PREFERRED EMBODIMENTS

Figure 1:
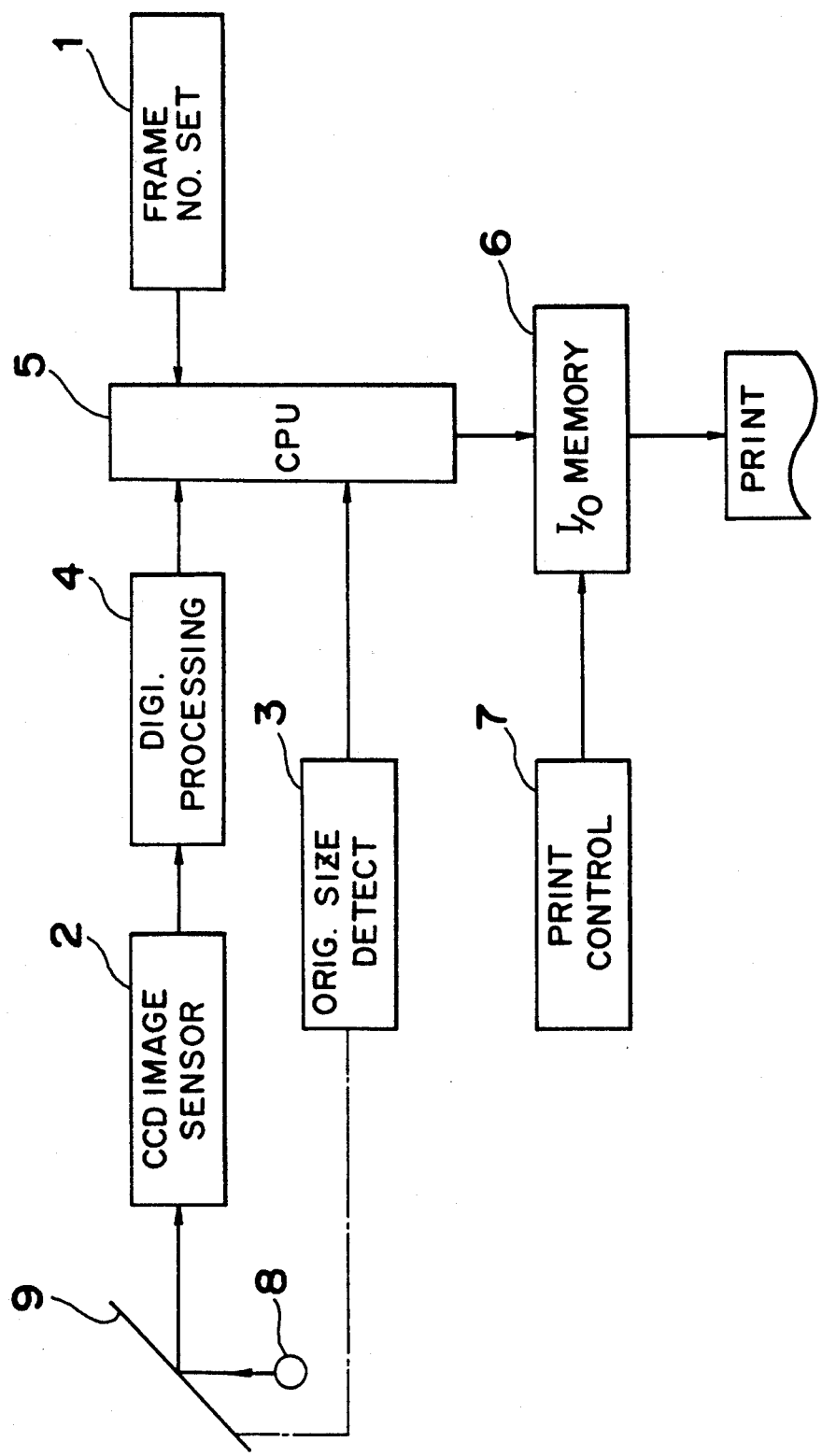
FIG. 1 is a block diagram showing the constitution of an image processing device of the present invention.

Referring to FIG. 1, an image processing device according to the present invention is shown. The image processing device comprises a frame number setting unit 1 for setting a number of frames of an original 9 to be printed on one or more printing materials, a CCD image sensor 2 for picking up a visual information of the original 9, an original size detecting unit 3 for detecting the size of the original 9, a digital processing unit 4, a CPU 5, an interface memory unit 6, and a print control unit 7 for controlling the printing operation of the image of original 9.

The frame number setting unit 1 is provided so that a user can select a number of frames of the original 9 to be printed on the surfaces of plural printing papers. If the size of the original 9 is smaller than that of the printing paper on which the original is printed, it is possible to form two or more frames of original image on the printing paper. In this case, the printing papers required to print the required number of frames which the user selects through the document number setting unit 1 is likely to be less than the required number of the frames.

The information of the desired number of the frames which the user selects through the frame number setting unit 1 is transferred to the CPU 5 wherein such information is recognized.

When a lamp 8 irradiates a light on the original 9 placed on a table (not shown), the irradiated light is reflected by the surface of the original 9. The reflected light carrying a visual information of the original is applied to the CCD image sensor 2 in which the reflected light from the original 9 is converted to an electric signal. For example, the CCD sensor 2 receives the reflected light from a predetermined area of the original and reads the image data line-by-line, and supplies the image data to digital processing unit 4 through serial/parallel convertor.

The digital processing unit 4 converts the electric signal of the image data transferred from the CCD sensor 2 into digital signal, reconstitutes a two-dimensional image data and then after transfers such two-dimensional image data to the CPU 5 as a developed information.

The CPU 5 also receives from the document size detector 3 a signal representing the size (width and length) of original 9. The size of original 9 is measured by the following manners. The width is measured by moving a original guide (not shown) loaded on an original tray (not shown), and the length is measured by counting time required to feed the original 9.

Furthermore, the CPU 5 is supplied with a signal representing the size of printing paper. Such information can be obtained by switches (not shown) provided in the image processing device and a protruding member provided on a paper cartridge (not shown), such that the switch which can be operated by the protruding member indicates the paper size by the on and off condition of the switches.

Furthermore, provided in the image processing device is a paper detector (not shown) for judging if any sheet of printing paper is stored in the cartridge. This paper detector has a photo interrupter for emitting a light toward inside the cartridge through the hole arranged at the bottom of the cartridge, and for detecting the emptiness when such emitted light is detected at the side opposite to the bottom of the cartridge.

The CPU 5 is connected to the interface memory unit 6 for receiving the developed information of digital signal. For example, in the case where a plurality of frames of the image of the original is to be formed on one or more printing papers, the CPU 5 provides the original images repeatedly to the interface memory unit 6 until the number of frames of the original image coincides with the number previously selected through the frame number setting unit 1.

The CPU 5 produces, in addition to the developed information, an information of boundary between the frames to be stored in the memory storage unit 6.

The CPU 5 determines the layout of a plurality of frames to be formed on the printing paper, in consideration of the original size and currently selected printing paper size, so as to include as much as possible frames on a printing paper. There are two layout modes: The vertical mode wherein the frames each carrying original image all oriented vertically; and the lateral mode wherein the frames are oriented laterally.

Furthermore, in the case where selected printing paper cartridge becomes empty during the printing operation, the papers in another paper cartridge are used to continue the printing operation to produce the required number of frames. In this case, the different size papers are selected in the predetermined priority order. Thus, the printing operation automatically continues without any interruption until the selected required numbers of frames are printed. It is noted that the presence of printing papers currently used in the cartridge is detected by the paper detector as described in the above.

The interface memory unit 6 is connected to the print control unit 7. The print control unit 7 executes printing operation to print the required number of frames of the original image on printing papers according to the developed information, i.e., the digitalized data as stored in the interface memory unit 6.

In the construction as described in the above, the interface memory unit 6 sets a memory area corresponding to the size of the selected printing paper and arranges as much frames as possible to be accommodated within the selected printing paper to form a developed information or memory unit 6. Then, the developed information on memory unit 6 is printed repeatedly to provide the required number of frames.

It should be understood that before the printing, the original size (width and length) is detected by th document size detector 3, and the original image detected by the CCD image sensor 2 is converted to digital signal by the digital processing unit 4.

These information and digital signal are stored in the interface memory unit 6 in a developed pattern by the control of CPU 5. By the control of the print control unit 7, the developed pattern as stored in memory 6 is printed repeatedly on printing papers until the required numbers of frames are provided.

Figure 2:
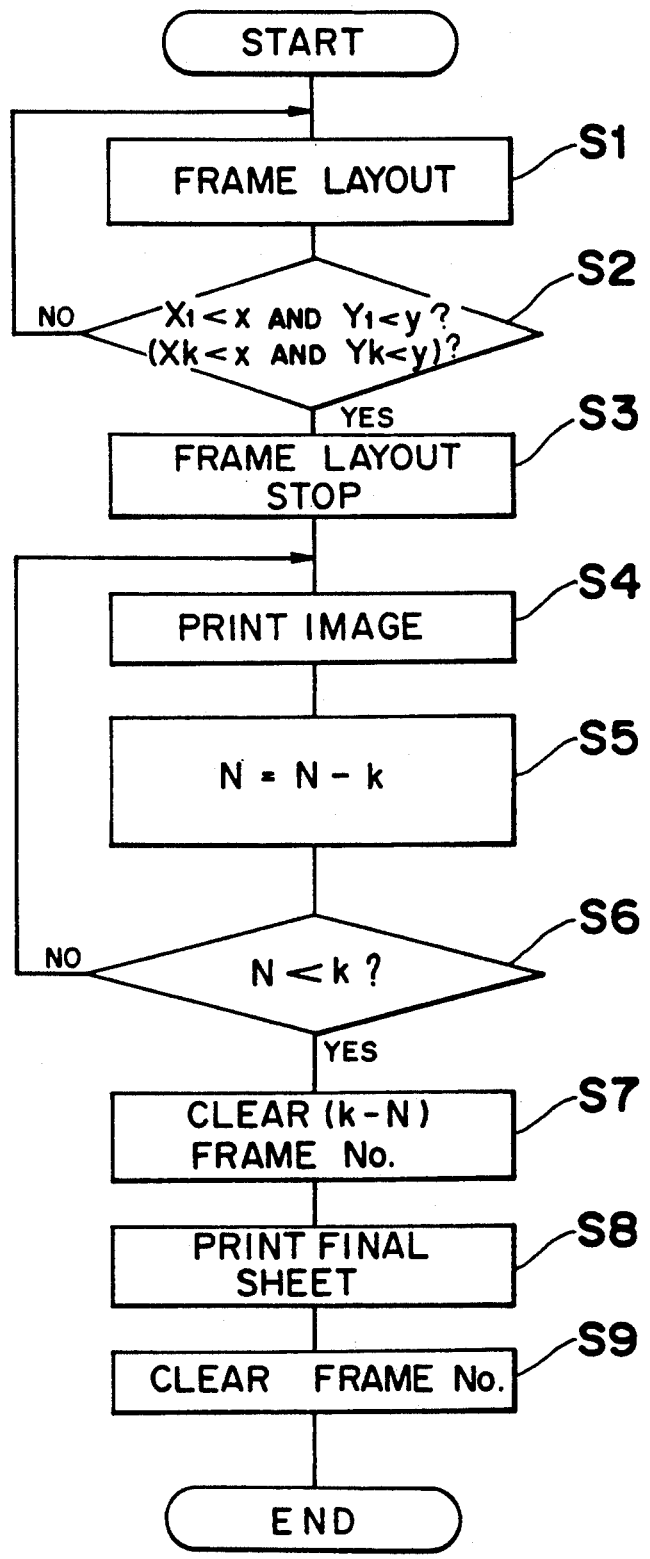
FIG. 2 is a flow chart of the multi-frame printing operation of an image processing device of the present invention.

Referring to FIG. 2, a flow chart showing the printing operation is illustrated It is assumed that the original size is smaller than the size of printing paper currently selected.

When the print routine starts, CPU 5 recognizes the required number of frames of the original image to be printed as selected by the user through the frame number setting unit 1. The original placed on the table (not shown) is read out by the CCD image sensor 2, and the read out original image in the form of light is converted to electric signal which is transferred to digital processing unit 4.

The digital processing unit 4 converts the electric signal to digital signal, and then transfers the same to CPU 5. By CPU 5, a memory area corresponding to the printing paper in the interface memory unit 6 is set, and a layout of the image data of one frame in the preset memory area is determined (step S1).

Figure 3A:
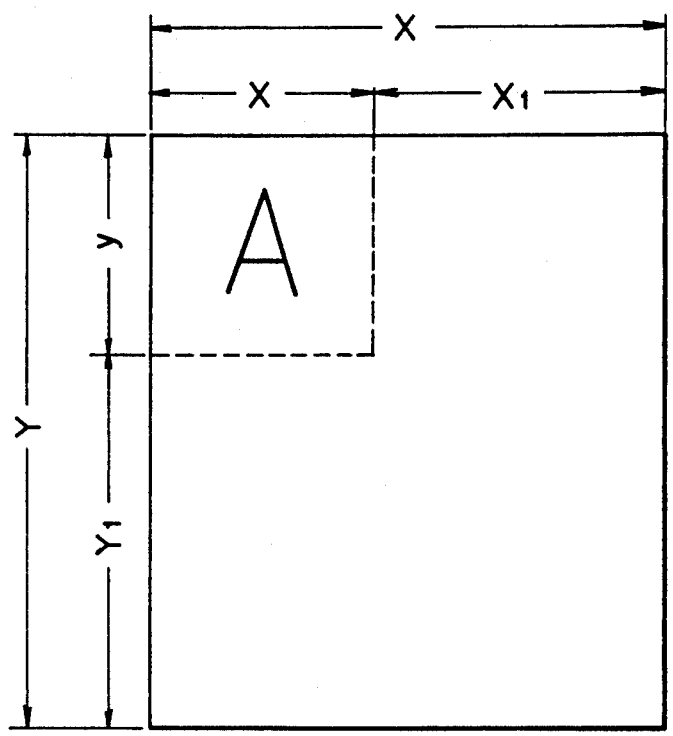
FIG. 3a is an illustration of assistance in explaining the condition that one frame image data is developed in a preset memory area of the interface memory unit of the present invention.

Referring to FIG. 3a, an example of one frame image data developed in a set memory area of the interface memory unit 6 is shown. A small rectangle defined by a dotted line and having width "x" and length "y" represents one frame image data having an character "A".

A large rectangle having width "X" and length "Y" corresponds to a selected printing paper.

It is to be noted that the size X and Y of various printing papers are previously registered in CPU 5 relatively to the loading operation of various paper cartridges (not shown), as described the above.

Dimensions "X1" and "Y1" represent the length of the fresh memory area which are not yet occupied by the image of the original at the upper side and the left side of the initially preset memory area as obtained when step S1 is carried out once. Thus, it is satisfied that, $$X = x + Xl \text{ and } Y = y + Yl.$$

When step S1 is carried out repeatedly for k times, as in a manner described later, the length of the fresh memory area at the upper side and the left side will be expressed as Xk and Yk, respectively.

Figure 3B:
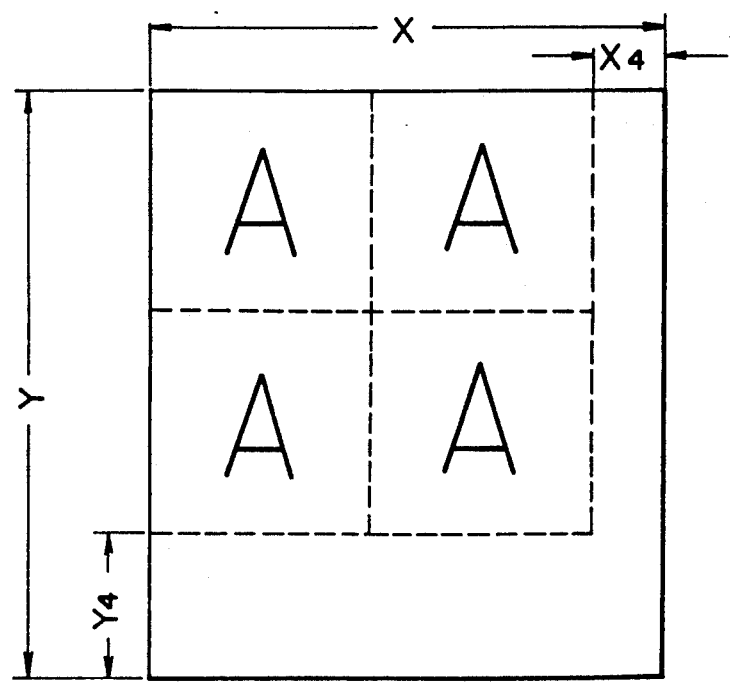
FIG. 3b is an illustration of assistance in explaining the condition that four frame image data are developed in the preset memory area of the interface memory unit of the present invention.

Referring to FIG. 3b, an example of the above generalized relationship is shown, particularly when step S1 is carried out four times, thus providing four frame image data in the preset memory area in the interface memory unit 6. In this case, Xk and Yk will be expressed as X4 and Y4, respectively.

At step S2, the CPU 5 compares the dimensions x and y with Xk and Yk (for example, X1 and Y1), respectively. When it is judged that $X1 \geq x$, and $Y1 \geq y$, the operation returns to step S1, and stores another frame image data in the preset memory area. The operation of steps S1 and S2 are repeated until it is judged that $Xk < x$ and $Yk < y$.

When it is judged that $X1 < x$ and $Y1 < y$ ($Xk < x$, and $Yk < y$) at step S2, the further adding of the frame image data in the preset memory area is stopped (step S3).

Referring to FIG. 3b, an example of four frame image data stored in the preset memory area in the interface memory unit 6 is shown.

At step S4, the data stored in the preset memory area is printed on the printing paper by the control of the print control unit 7. Then, the required frame number N (or the remaining frame numbers N to be printed) is subtracted by the number of frames that has been printed on one printing paper as effected in step S4, and the remaining frame number N is renewed. Then N obtained at step S5 is compared with k (step S6).

At step S6, if it is judged that $N \geq k$, the operation returns to step S4 and again prints the data stored in the preset memory area.

However, if it is judged that $N < k$ at step S6, meaning that the number of frame image data to be printed will exceed the required number N, if all the data stored in the preset memory area is printed again, (k−N) numbers of frame image data are erased from the preset memory area in the interface memory unit 6 (step S7).

Thus, on the final sheet of printing paper, only N numbers of frames are printed (step 8).

At step S9, the number of frames as selected by the frame number setting unit 1 is cleared, and then thereafter the routine completes.

Judging from the above description, it is understood that number C repeating cycles through steps S4 to S6 to form the required frames of original image can be expressed by the following equation.

$$C = N \div k$$

(When this fraction generates quotients and reminders, C will be rounded up so that one is added to the quotient). For example if it is presumed that N = 100 and k = 9, C becomes 11 with a reminder 1. Then C will be rounded up to 12. This means that twelve sheets of printing paper are necessary for printing one hundred frames of original image. In this case, only one document image is printed on the twelfth sheet of printing paper.

Next, it is assumed that the original and the printing paper has almost the same size, and a plurality of frames will be printed over a plurality of printing papers. It is noted that references used for the components having similar function and similar physical value in the above mentioned case are also adapted in this case without further explanation for the sake of brevity.

In this case, the original document size is almost the same as that of the printing paper, and the magnifying rate which is defined by the ratio of the printed image to the original image is automatically selected. After automatic selection of the magnifying rate, the operation is executed in accordance with the flow charts shown in FIG. 2.

CPU 5 determines the magnifying rate in the following manner. CPU 5 calculates the original document areas $S_{ORG}$ by the equation of $S_{ORG} = (x \times y)$. At the same time of calculation of $S_{ORG}$, CPU 5 calculates the printing paper area $S_{COP}$ by the equation of $S_{COP} = (X \times Y)$ in accordance with information on the printing paper size previously selected and detected.

Next, those two areas $S_{ORG}$ and $S_{COP}$ obtained in the above described manner are compared each other to find the comparison magnifying rate Na by the following equation.

$$Na = S_{COP} \div S_{ORG}.$$

And then, in accordance with required number N of frames of original image as selected by the frame number setting unit 1 and "Na" obtained by the above equation, a standard magnifying rate "a" is obtained by the following equation.

$$a = Na \div N.$$

Then, based on the standard magnifying rate a, Nx and Ny which represent numbers of images that can be accommodated in lateral direction and vertical direction of the printing papers, respectively, are obtained by the following equations.

$$Nx = [X \div (x \times a)]$$

$$Ny = [Y \div (y \times a)]$$

Since each of the values Nx and Ny obtained in the above described manner does not necessarily result in an integer, a rounding process is carried out so as to satisfy that $N-(Nx \times Ny)=0$. The rounded values of Nx and Ny in the above described manner shall be referred to as Nx, and Ny', respectively.

In accordance with these values Nx' and Ny', a rated magnifying rate Ax in the lateral direction corresponding to the width, and a rated magnifying rate Ay in the vertical direction corresponding to the length are obtained by the following equations.

$$Ax = X \div Nx'$$

$$Ay = Y \div Ny'$$

A magnified frame image magnified by the rated magnifying rates Ax and Ay will be used hereinafter as an original image in the operations of flow charts shown in FIG. 2.

In the case where the original is relatively small to enable a plurality of frames printed on one printing paper, there may be a case in which the number of frames that can fit in a printing paper is greater if the frames are aligned in a lateral mode than the vertical mode, (i.e., 90° tilted mode). Thus, the number of frames of original image to be produced on the preset memory area of the interface memory unit 6 depends on the conditions such as setting of the printing papers and the lateral or vertical positioning of the original document on the table.

The description given hereinbelow is directed to an example of effective printing operation realized by the automatic layout of frames laterally or vertically on the preset memory area, regardless of whatever direction the original document is positioned on the table.

Figure 4:
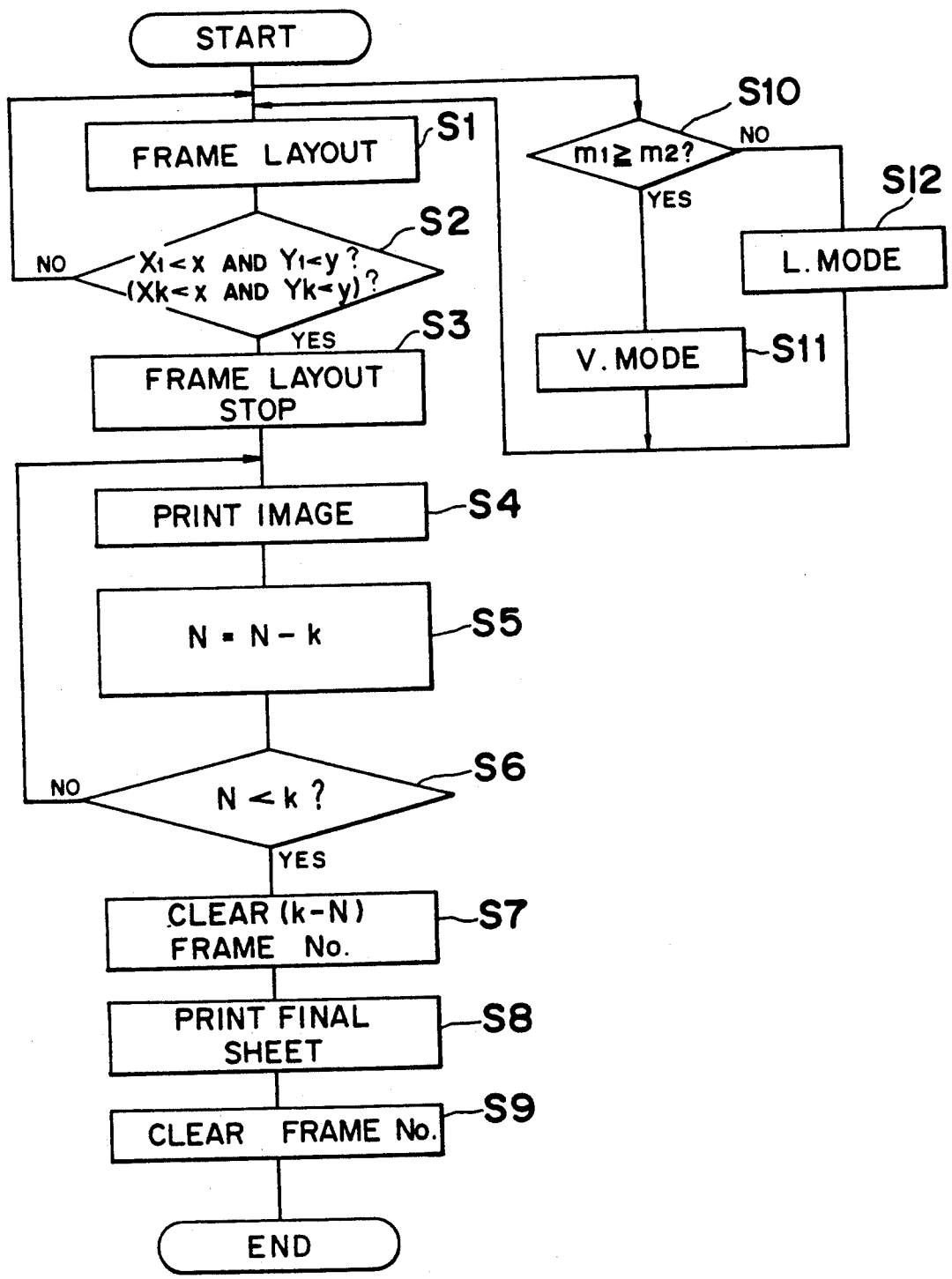
FIG. 4 is a flow chart of the multi-frame printing operation with a selection mode of frame layout of an image processing device of the present invention.

Referring to FIG. 4, the operation with the above mentioned automatic determination of the layout of frames of the original image on a printing paper is shown. It is to be noted that the references used for the components having similar function and similar physical value to those described above are also used in the description hereinbelow, and therefore, a detailed description therefor is omitted for the sake of brevity The flow chart shown in FIG. 2 and the flow chart shown in FIG. 4 have principally the same operation, but steps S10, S11 and S12 are additionally arranged in FIG. 4 to determine the layout of the frames.

When a print cycle starts, m1 and m2 are compared at step S10. Here, m1 is the number of frames that can be printed when the frames are aligned in the vertical orientation, and m2 is the number of frames that can be printed when the frames are aligned in the lateral orientation.

If it is judged that $m1 \geq m2$ at step S10 the image processing device according to the present invention is set to the vertical mode (step S11).

When it is judged that $m1 \leq m2$, the image processing device is set to lateral mode (step S12). After the mode selection, the operation enters into step S1 and then follows the same operation as described in connection with FIG. 2.

Next, an operation when the printing paper runs out during the printing operation is described. When the paper detector detects no presence of the printing paper in the cartridge, an alternative cartridge with a appropriate size printing papers is selected in a manner described below.

When the paper detector detects no presence of the printing paper, cartridges carrying similar size papers are designated for being used as a substitute. The priority is given to these various size printing paper such that a printing paper which can bear more images than other has the superior priority. After the priority is given, the printing paper which can bear the most frames according to the priority is selected. Thus, the printing operation is continued without any interruption to form required numbers of frames of original images For example, when A4 (297 mm × 210 mm) size printing paper is previously selected with the original document being B5 (257 mm × 182 mm) size, the substitution priority is in the order of papers of B4 (364 mm × 257 mm) size and B6 (182 mm × 128.5 mm) size provided that these different size papers B4 and B6 are available. If the printing paper of B4 size is selected for use, two frames of original document image can be formed on the printing paper of B4. If the user wishes to use on other size printing paper it is also possible to select a preferred printing paper manually.

Next, an operation for separating the frames images is described. To facilitate the separation of frames, it is preferable to further include information related to the boundaries between frames in the developed information in the digital form. For example, based on the information related to the boundaries, dotted lines or solid lines processed so that images printed on the printing paper surface are confined may the dotted line solid line may be drawn along the boundaries. Such as shown in FIGS. 3a and 3b, so that the printed images is confined by the dotted line is shown. It is easy to separate the frames by cutting along the lines. Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processing device for printing a required number of frames of an image of an original (9) on one or more printing material frames comprising:

an original size detecting means (3) for detecting frame dimensional information (x, y) of said original (9);

a dimension detecting means for detecting frame dimensional information (X, Y) of said printing materials;

a setting means (1) for setting said required number of said original frames; and a data processing means (5) for processing said dimensional information (X, Y; x, y) of said original (9) and said printing materials to determine a maximum number of said original frames which can be printed within a single printing material frame, said data processing means including means for determining whether said maximum number is obtained with said original frames to be printed aligned in a vertical orientation with respect to said printing material frame or aligned in a lateral orientation with respect to said printing material frame and for selecting the one of the orientations producing said maximum number, whereby a minimum number of said printing material frames are used to print said required number of said original frames.

2. An image processing device as in claim 1 further comprising:
   an image detecting means (2) for detecting image data of said original
   a memory means for storing one or more frames of an image of an original; and
   said data processing means being responsive to said image detecting means for storing said maximum number of original frames in said memory means.

3. An image processing device as in claim 1 wherein said printing material dimension detecting means includes switching means for detecting said frame dimensional information.

4. An image processing device as in claim 1 wherein said data processing means includes means for causing boundary indicia to be printed between said original frames printed within a printing material frame.

5. An image processing device for printing a required number of frames of an image of an original (9) on one or more printing material frames comprising:
   an image detecting means (2) for detecting image data of said original;
   a memory means for storing one or more frames of an image of an original;
   an original size detecting means (3) for detecting frame dimensional information (x, y) of said original (9);
   a dimension detecting means for detecting frame dimensional information (X, Y) of said printing materials;
   a setting means (1) for setting said required number of said original frames; and
   a data processing means (5) for processing said dimensional information (X, Y; x, y) of said original (9) and said printing materials to determine a maximum number of said original frames to be printed within a single printing material frame,
   said data processing means being responsive to said image detecting means for storing said maximum number of original frames in said memory means, said data processing means includes further means for reducing a number of original frames stored in said memory means below said maximum number so that a last of said minimum number of printing material frames includes only a number of original frames necessary to obtain a printing of said required number of original frames,
   whereby a minimum number of said printing material frames are used to print said required number of said original frames.

6. An image processing device for printing a plurality of frames of an image of an original on printing material frames comprising:
   printing material storing means for storing printing material having a plurality of sizes;
   means for selecting a size of printing material to be used for printing;
   means for detecting a presence of said selected size of printing material,
   a selecting means for selecting a required number of said image frames;
   an image detecting means for detecting image information of said original;
   a dimension detecting means for detecting a frame size of said original;
   data processing means responsive to said required number selecting means, said size selecting means, said image detecting means and said dimension detecting means for determining a maximum number of original frames which can be arranged within a printing material frame;
   memory means responsive to said data processing means for storing image data of said original a number of times equal to said determined maximum number laid out within a single printing material frame;
   print control means connected to said memory means for obtaining a repetitive printing of the stored original image data until said required number of original image frames are printed; and
   said data processing means including means responsive to said means for selecting a printing material size and said presence detecting means for controlling a selection of an alternative available printing material size when the originally selected size has run out and for causing said maximum number to be redetermined in accordance with a selection of said alternative available printing material size.

7. An image processing device as in claim 6 wherein said memory means and said print control means are responsive to said redetermined maximum number for storing and obtaining printing, respectively, in accordance with said redetermined maximum number.

8. An image processing device as in claim 6 wherein said data processing means includes means for determining whether said maximum number is obtained with said original frames to be printed aligned in a vertical orientation with respect to said printing material frame or aligned in a lateral orientation with respect to said printing material frame.

9. An image processing device as in claim 6 wherein said data processing means includes means for causing boundary indicia to be printed between said original frames printed within a printing material frame.

10. An image processing device for printing a plurality of frames of an image of an original on a minimum number of printing material frames comprising:
    a selecting means for selecting a required number of said image frames;
    an image detecting means for detecting image information of said original;
    a dimension detecting means for detecting a frame size of said original;
    data processing means responsive to said selecting means, said image detecting means and said dimension detecting means for determining a maximum number of original frames which can be arranged within a printing material frame;
    memory means responsive to said data processing means for storing image data of said original a number of times equal to said determined maximum number laid out within a single printing material frame;
    print control means connected to said memory means for obtaining a repetitive printing of the stored original image data until said required number of original image frames are printed; and
    said data processing means includes further means for reducing a number of original frames stored in said memory means below said maximum number so that a last of said minimum number of printing material frames includes only a number of original frames necessary to obtain a printing of said required number of original frames.

* * * * *